United States Patent
Lee et al.

(10) Patent No.: US 7,366,415 B2
(45) Date of Patent: Apr. 29, 2008

(54) WAVELENGTH DIVISION MULTIPLEXING-PASSIVE OPTICAL NETWORK CAPABLE OF INTEGRATING BROADCAST AND COMMUNICATION SERVICES

(75) Inventors: Ki-Cheol Lee, Suwon-shi (KR); Jun-Ho Koh, Suwon-shi (KR); Yun-Je Oh, Yongin-shi (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 696 days.

(21) Appl. No.: 10/694,456

(22) Filed: Oct. 27, 2003

(65) Prior Publication Data

US 2004/0184806 A1 Sep. 23, 2004

(30) Foreign Application Priority Data

Mar. 17, 2003 (KR) ............... 10-2003-0016373

(51) Int. Cl.
*H04J 14/00* (2006.01)
(52) U.S. Cl. .................................. 398/66
(58) Field of Classification Search ............. 398/58, 398/63, 66–73, 79; 725/129
See application file for complete search history.

(56) References Cited

U.S. PATENT DOCUMENTS 5,822,102 A * 10/1998 Bodeep et al. ............. 398/69
7,184,664 B2 * 2/2007 Farmer et al. ............. 398/72

FOREIGN PATENT DOCUMENTS

| JP | 56-50658 | 5/1981 |
|---|---|---|
| JP | 60-172893 | 9/1985 |
| JP | 61-139129 | 6/1986 |
| JP | 61-244138 | 10/1986 |
| JP | 07-183870 | 7/1995 |
| JP | 2000-068982 | 3/2000 |
| JP | 2000-244404 | 9/2000 |
| JP | 2002-261696 | 9/2002 |
| JP | 2002-271364 | 9/2002 |
| JP | 2003-229837 | 8/2003 |

* cited by examiner

*Primary Examiner*—Jason Chan
*Assistant Examiner*—Quan-Zhen Wang
(74) *Attorney, Agent, or Firm*—Cha & Reiter, LLC (57) ABSTRACT

Disclosed is a wavelength division multiplexing-passive optical network (WDM-PON) that integrates broadcast and communication data, and transmit using WDM. An optical line terminal (OLT), connected to a broadcasting network and an Internet protocol (IP)-network, receives a digital broadcast signal from the broadcasting network and a first communication signal from the IP network, and transmits them as a single (broadcast/communication) integrated optical signal after photoelectric conversion, and further transfers a second communication signal from a service user to the IP network. An OLT/ONU on the user side transfers integrated optical signal from OLT to the user, and transfers channel-information data of a digital broadcast desired by the user and user data including the second communication signal from the user to the OLT. A first WDM demultiplexer WDM-demultiplexes the single signal and transfers it to the OLT/ONU. A first WDM multiplexer WDM-multiplexes the user data and transfers it to the OLT.

7 Claims, 6 Drawing Sheets

WAVELENGTH DIVISION MULTIPLEXING-PASSIVE OPTICAL NETWORK CAPABLE OF INTEGRATING BROADCAST AND COMMUNICATION SERVICES

CLAIM OF PRIORITY

This application claims priority to an application entitled "WAVELENGTH DIVISION MULTIPLEXING LIGHT SOURCE APPARATUS USING SEMICONDUCTOR OPTICAL AMPLIFIER," filed in the Korean Intellectual Property Office on Mar. 17, 2003 and assigned Serial No. 2003-16373, the contents of which are hereby incorporated by reference.

BACKGROUND OF THE INVENTION

1. Field of the Invention

The present invention relates to a Passive Optical Network (PON) using Wavelength Division Multiplexing (WDM).

2. Description of the Related Art

Most broadcast and communication service subscribers currently use data communication services such as Internet at rates of about several tens of Kbps (bits per second) to several tens of Mbps. These rates are achieved through xDSL, a cable modem, a dial-up modem, metro-Ethernet, etc. Subscribers also use broadcasting services such as cable broadcasting through a coaxial cable, satellite broadcasting through a satellite, terrestrial broadcasting, etc.

Data rates of about 100 Mbps are required to effectively provide subscribers with services such as high-capacity image information, VoD (Video on Demand), and high-quality digital broadcasts. However, the prior art has many limitations in accommodating such data in terms of its capacity and speed. Accordingly, there is a need for implementing an optical network using optical communication. To this end, PON technology has been proposed and developed as an economic way to implement an optical network.

The PON is classified mainly into an Asynchronous Transfer Mode (ATM)-PON, an Ethernet-PON, and a WDM-PON according to its implementation methods.

The ATM-PON and Ethernet PON have a number of limitations including (1) no transparency regarding the speed of data to be provided to subscribers, and (2) complicated Media Access Control (MAC) technologies are required for an Optical Line Terminal (OLT) because the same wavelength is used in the upstream transmission. The ATM-PON and Ethernet PON also have a problem in that it is difficult to accommodate digital broadcasts.

The WDM-PON does not have the limitation on the speed of data, and also does not require a complicated MAC technology. In addition, it is easy for the WDM-PON to accommodate digital broadcasting services.

Figure 1:
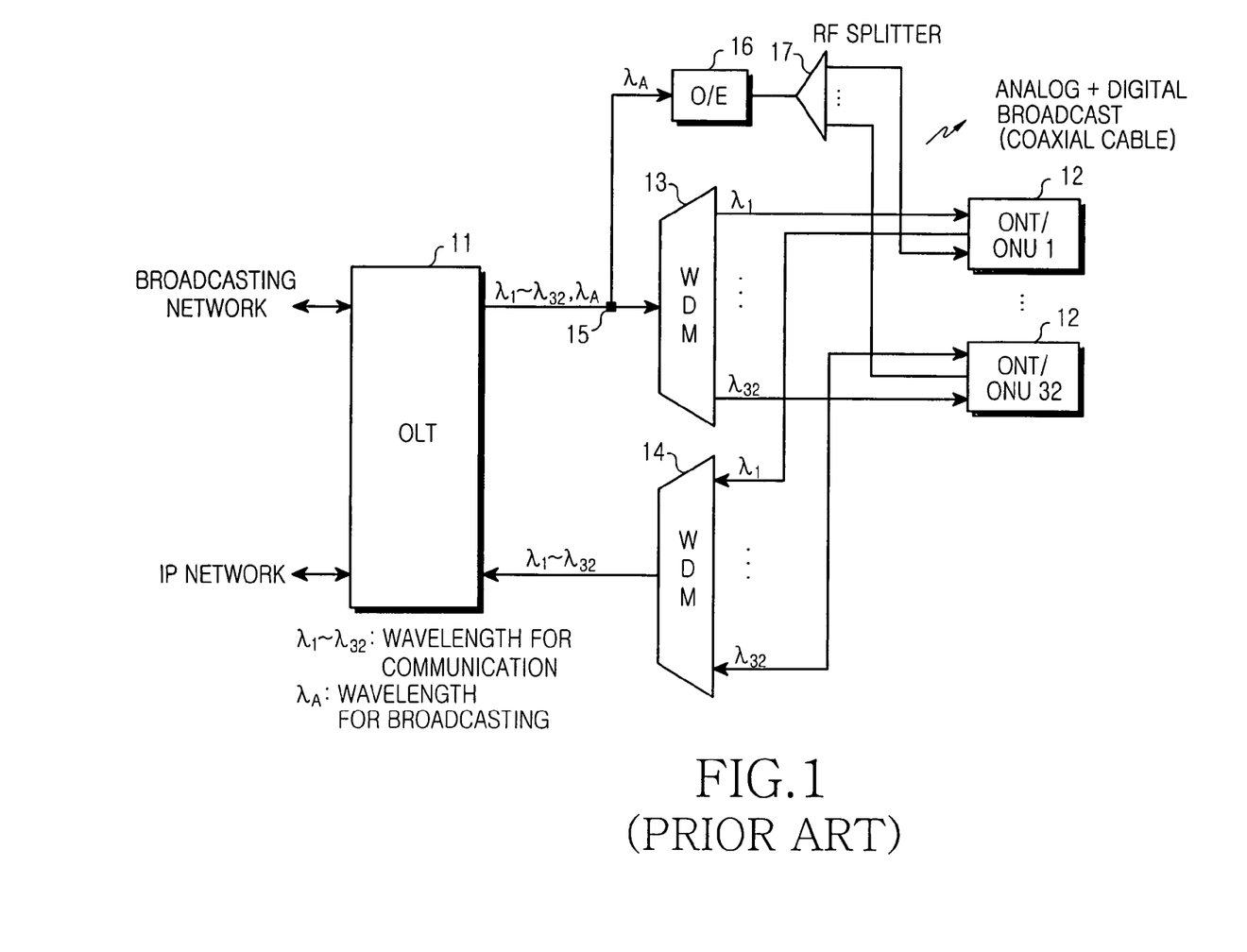
FIG. 1 shows one prior-art example of a WDM-PON.

FIG. 1 shows one prior-art example of a WDM-PON that integrates broadcast and communication services. As shown, the WDM-PON includes an Optical Line Terminal (OLT) 11, Optical Network Terminal/Optical Network Unit (ONT/ONUs) 12, an optical splitter 15, a photoelectric (or optical-to-electrical) converter (O/E) 16, a Radio Frequency (RF) splitter 17, a WDM demultiplexer 13, and a WDM multiplexer 14. The OLT 11 is connected to a broadcasting network for broadcasting services and an Internet Protocol (IP) network for communication services. The OLT 11 receives broadcast signals from the broadcasting network and communication signals from the IP network. The OLT 11 transmits the received signals as optical signals after their photoelectric conversion. In addition, the OLT 11 transfers communication signals, received from service subscribers, to the IP network. The ONT/ONUs 12 are devices on the user side for transferring the broadcast and communication signals, received from the OLT 11, to service users and transferring communication signals from the service users to the OLT 11. The optical splitter 15 splits the broadcast and communication signals from the OLT 11 into a broadcast signal $\lambda_A$ and communication signals $\lambda_1$ to $\lambda_{32}$, and transmits them. The photoelectric converter 16 photoelectrically converts the broadcast signal $\lambda_A$ split through the optical splitter 15. The RF splitter 17 distributes the converted electric broadcast signal to each of the ONT/ONUs 12. The WDM demultiplexer 13 WDM-demultiplexes the communication signals $\lambda_1$ to $\lambda_{32}$, and transfers them to the ONT/ONUs 12. The WDM multiplexer 14 WDM-multiplexes the communication signals $\lambda_1$ to $\lambda_{32}$ from the ONT/ONUs 12, and transfers them to the OLT 11. $\lambda_1$ to $\lambda_{32}$ are used as wavelength channels for communication, and $\lambda_A$ is used as wavelength channels for broadcasting.

Operationally, a broadcast signal $\lambda_A$ in downstream transmission is optically split through the optical splitter 15 in the front end of the WDM demultiplexer 13. Then it is photoelectrically converted in the photoelectric converter (O/E) 16. After the converted signal is separated into broadcast signals corresponding respectively to service users through the RF splitter 17, they are transmitted to the respective service users through a coaxial cable.

After being demultiplexed in the wavelength demultiplexer 13 on a wavelength-by-wavelength basis, the communication signals $\lambda_1$ to $\lambda_{32}$ are transmitted to the respective service users.

Disadvantageously, in such a prior art system, the transmission of broadcast and communication signals are not integrated in one wavelength. Instead, the broadcast signal is transmitted with its analog and digital broadcast signals integrated in one wavelength $\lambda_A$. The communication signals are provided to respective subscribers through wavelengths $\lambda_1$ to $\lambda_{32}$ In addition, in such a prior art system, the optically-split broadcast signal $\lambda_A$ is photoelectrically converted. Its analog and digital broadcast signals are transmitted through a cable network. Such a cable network is installed to provide the existing broadcasting services defined in bands up to around 550 MHz. However, it is impossible to accommodate analog/digital broadcasts using the existing cable network because the domestic digital cable broadcasting standard was established to have a band of around 850 MHz for analog and digital broadcast signals.

Thus, in order to accommodate analog/digital broadcasts, such a system (1) requires the lead-in coaxial cable in each subscriber to be replaced with a coaxial cable of an extended band, or (2) to install a new extension coaxial cable with the existing coaxial cable being retained.

Figure 2:
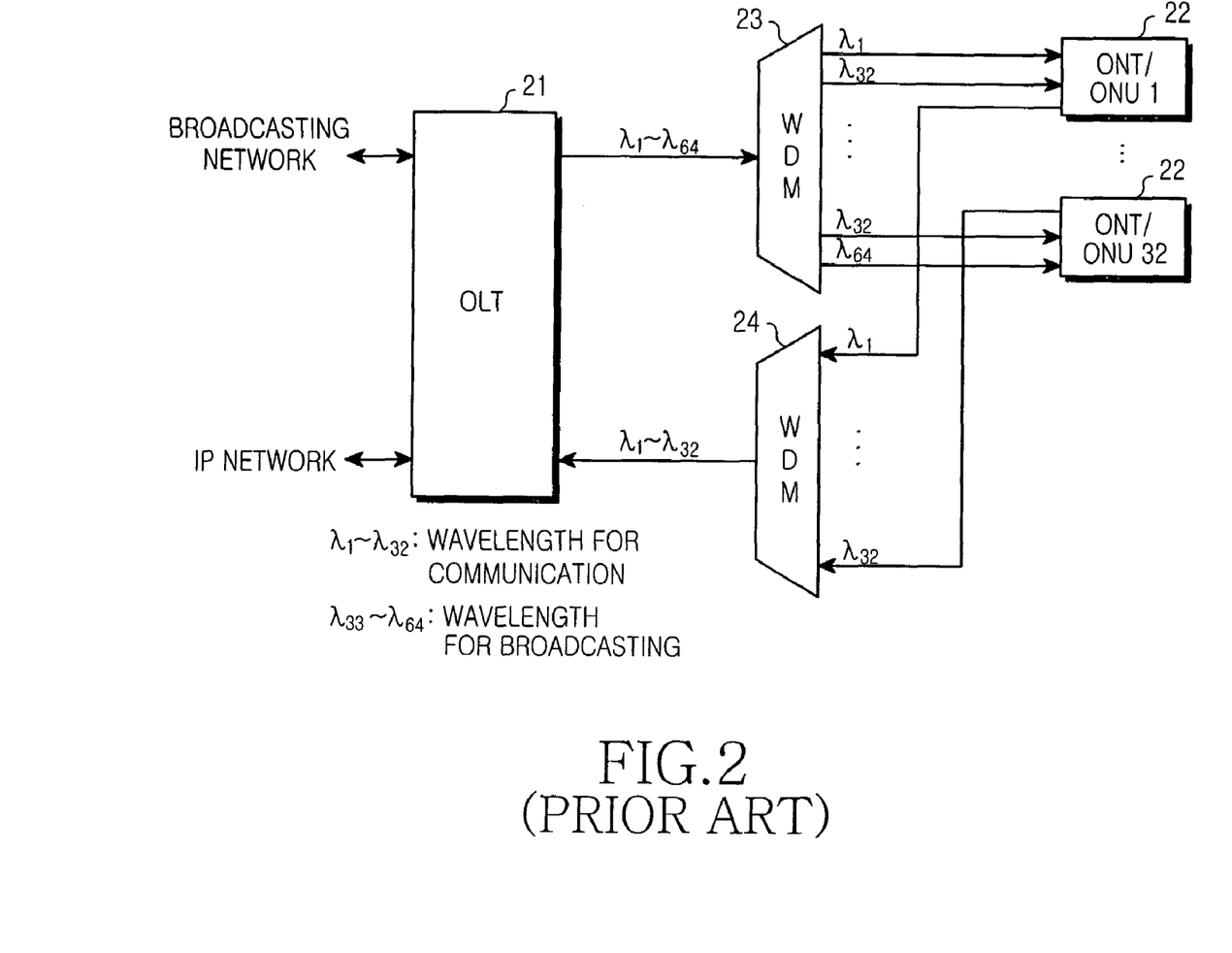
FIG. 2 shows another example of a WDM-PON.

FIG. 2 shows another prior-art example of a WDM-PON that integrates broadcast and communication services. As show, the WDM-PON includes an OLT 21, ONT/ONUs 22, a WDM demultiplexer 23, and a WDM multiplexer 24. The OLT 21 is connected to a broadcasting network for broadcasting services and an IP network for communication services. The OLT 21 receives broadcast signals from the broadcasting network and communication signals from the IP network, and transmits the received signals as optical signals after their photoelectric conversion. The OLT 21 further transfers communication signals, received from service subscribers, to the IP network. The ONT/ONUs 22 are devices on the user side for transferring the broadcast and communication signals, received from the OLT 21, to service users, and transferring communication signals from the service users to the OLT 21. The WDM demultiplexer 23 WDM-demultiplexes both the communication signals $\lambda_1$ to $\lambda_{32}$ and the broadcast signals $\lambda_{33}$ to $\lambda_{64}$, and transfers them to the ONT/ONUs 22. The WDM multiplexer 24 WDM-multiplexes the communication signals $\lambda_1$ to $\lambda_{32}$ from the ONT/ONUs 22, and transfers them to the OLT 21.

In such a prior art system, it is possible to provide high-capacity data communication and broadcasting services because wavelengths for broadcast and communication are given individually to each of subscribers. However, as with the prior art system of FIG. 1, this system does not provide for integrated transmission of the broadcast and communication signals. In addition, this system must include twice as many optical transmitters as the prior art system of FIG. 1. In addition, each subscriber must use two optical receivers in order to receive both a communication wavelength signal and a broadcast wavelength signal. This causes an increase in the cost of the WDM-PON system, consequently imposing a burden on the subscribers. Further, in the WDM-PON, the number of subscribers coincides with the number of wavelengths. Thus, the prior art system of FIG. 2 has a further limitation in that it can handle only half the number of subscribers as compared to the prior art system of FIG. 1, because each subscriber uses two wavelengths.

SUMMARY OF THE INVENTION

Therefore, the present invention has been made to reduce or overcome the limitations of the prior art. One object of the present invention to provide a passive optical network wherein digital broadcasting services and communication services are integrated and transmitted using wavelength division multiplexing).

Another object of the present invention is to provide high-speed and high-capacity data and broadcasting services using a WDM-PON. In addition, to accommodate analog broadcast services by utilizing the installed coaxial cable base, whereby it is possible to comply with the domestic digital cable standard with no need to replace the existing coaxial cable.

Still another object of the present invention is to multiplex a digital broadcast signal and a communication data signal in an OLT so as to provide the signals to each subscriber through a single wavelength. Thus, each subscriber requires only one optical transmitter and one optical receiver, thereby achieving a low-priced WDM-PON system. In addition, the broadcast and communication signals are transmitted in an integrated single wavelength, thereby making it easier to secure transmittable channels.

In accordance with one aspect of the present invention, a WDM-PON (Wavelength Division Multiplexing-Passive Optical Network) is provided that enables the integration of broadcast and communication services. The WDM-PON includes an optical line terminal) to (1) receive a digital broadcasting signal from a broadcasting network and first communication signal from an internet protocol network, and (2) transmitting the received broadcast and the first communication signal as a single integrated optical signal;

an optical network terminal/optical network unit) as a user-side device for transferring (1) the integrated optical signal, from the optical line terminal, to a service user, and (2) user data from the service user to the optical line terminal;

a first WDM demultiplexer for WDM-demultiplexing the single broadcast/communication-integrated optical signal from the optical line terminal, and transferring it to the optical network terminal/optical network unit; and a first WDM multiplexer for WDM-multiplexing the user data from the optical network terminal/optical network unit and transferring it to the optical line terminal.

In accordance with another aspect of the present invention, a WDM-PON (Wavelength Division Multiplexing-Passive Optical Network) is provided that enables the integration of broadcast and communication data, comprising:

an optical line terminal to (1) receive a digital broadcasting signal from broadcasting network and a first communication signal from an Internet protocol network, and (2) transmitting the received broadcast and the first communication signals as a single integrated optical signal;

an optical network terminal/optical network unit) as a user-side device for transferring (1) the single integrated optical signal, from the optical line terminal, to a service user, and (2) user data from the service user to the optical line terminal using an optical signal having a wavelength different from the integrated optical signal; and a first WDM multiplexer/demultiplexer for 1) receiving and WDM-demultiplexing the single integrated optical signal from the optical line terminal, 2) transferring the integrated optical signal to the optical network terminal/optical network unit, 3) WDM-multiplexing the user data from the optical network terminal/optical network unit, and 4) transferring the user data to the optical line terminal.

BRIEF DESCRIPTION OF THE DRAWINGS

The present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail with reference to the annexed drawings. In the following description, well-known functions or constructions are not described in detail since they would obscure the invention in unnecessary detail.

Figure 3:
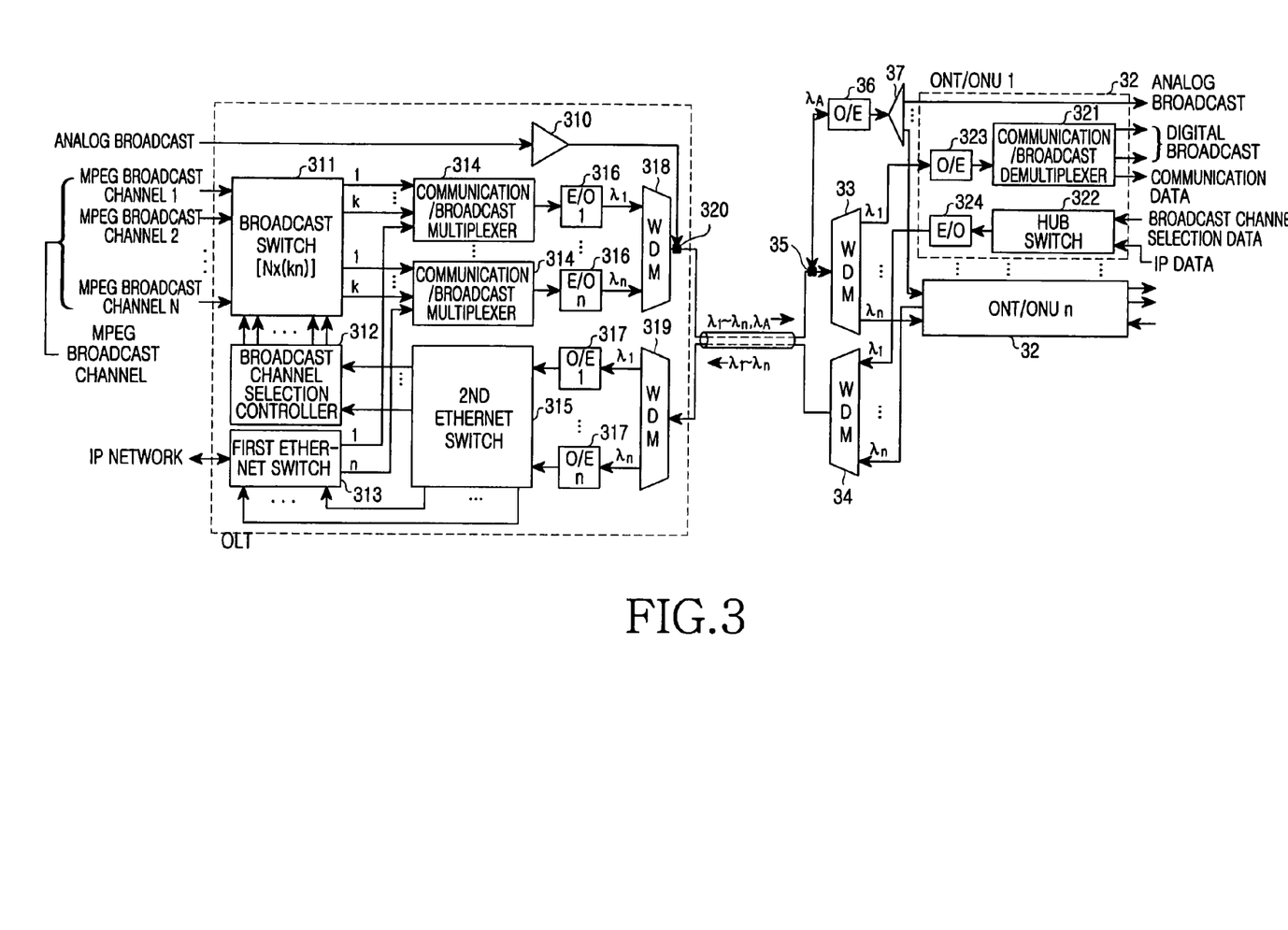
FIG. 3 shows a WDM-PON that enables the integration of broadcast and communication services, according to one embodiment of the present invention.

FIG. 3 shows a WDM-PON that enables the integration of broadcast and communication services, according to one embodiment of the present invention. As shown, the WDM-PON includes an OLT 31, ONT/ONUs 32, a WDM demultiplexer 33, and a WDM multiplexer 34. The OLT 31 is connected to a digital broadcasting network for broadcasting services, which is also referred to as a "broadcasting network", and an IP network for communication services. The OLT 31 receives digital broadcast signals from the broadcasting network and communication signals from the IP network. The OLT 31 transmits the received broadcast and communication signals as a single optical signal after their photoelectric conversion. The OLT 31 transfers communication signals, received from service users, to the IP network. The ONT/ONUs 32 are devices on the user side for transferring the digital broadcast and communication signals, received from the OLT 31, to the service users, and transferring communication signals from the service users to the OLT 31. The WDM demultiplexer 33 WDM-demultiplexes the digital broadcast and communication signals $\lambda_1$ to $\lambda_{32}$, and transfers them to the ONT/ONUs 32. The WDM multiplexer 34 WDM-multiplexes the communication signals $\lambda_1$ to $\lambda_{32}$ from the ONT/ONUs 32, and transfers them to the OLT 31. It is noted, that for illustrative purposes, reference is made to 32 lines of subscribers (ONT/ONU), but it is to be noted that it is only an example and the present invention is not limited to 32 lines.

For analog broadcast transmission, the OLT 31 includes an optical amplifier 310 for amplifying an analog broadcast signal, and an optical coupler 320 for combining the analog broadcast signal with digital broadcast and communication signals. Accordingly, the WDM-PON further includes an optical splitter 35, a photoelectric converter 36, and a RF splitter 37. The optical splitter 35 splits the broadcast and communication signals from the OLT 31 into an analog broadcast signal $\lambda_A$ and digital broadcast and communication signals $\lambda_1$ to $\lambda_{32}$, and transmits the split signals. The photoelectric converter 36 photoelectrically converts the analog broadcast signal $\lambda_A$ into an electric analog broadcast signal. The RF splitter 37 distributes the electric analog broadcast signal to each of the ONT/ONUs 32.

In particular, the OLT 31 includes a broadcast switch 311, a broadcast channel controller 312, a first Ethernet switch 313, a communication/broadcast multiplexer 314, a second Ethernet switch 315, an optical transmitter 316, an optical receiver 317, a WDM multiplexer 318, and a WDM demultiplexer 319. The broadcast switch 311 switches MPEG (Motion Picture Experts Group) broadcast data. The broadcast channel controller 312 selects a broadcast channel according to a service user's request. The first Ethernet switch 313 switches the communication data into the higher-level IP network or into the communication/broadcast multiplexer 314 for its transmission to the ONT/ONU 32. The communication/broadcast multiplexer 314 multiplexes the communication data and the digital broadcast data. The second Ethernet switch 315 switches communication data from the service user and channel information of digital broadcast desired by the service user. It also separates the communication data from the channel information. The optical transmitter 316 electro-optically converts the multiplexed communication/broadcast data. The optical receiver 317 photoelectrically converts the communication data from the service user from the ONT/ONU 32. The WDM multiplexer 318 multiplexes wavelength-by-wavelength signals that are optically modulated. The WDM demultiplexer 319 separates the optical signals, from the ONT/ONUs 32, from each other on a wavelength-by-wavelength basis. The OLT 31 may further include an optical amplifier 310 to amplify analog broadcast signals for analog broadcast transmission, and an optical coupler 320 to combine the analog broadcast signal with the communication and digital broadcast signals.

The ONT/ONU 32 includes an optical receiver 323, a communication/broadcast demultiplexer 321, a hub switch 322, and an optical transmitter 324. The optical receiver 323 photoelectrically converts communication/broadcast optical signals from the OLT 31. The communication/broadcast demultiplexer 321 separates the communication signal from the digital broadcast signal. The hub switch 322 joins together communication data from a service user and digital broadcast selection data for selecting a digital broadcast channel desired by the service user. The optical transmitter 324 performs an electro-optical conversion on the data for its transmission to the OLT 31.

The downstream transmission operation of the WDM-PON of FIG. 3 is further described below. The downstream transmission represents transmission from the OLT 31 to the ONT/ONU 32. MPEG digital broadcast data from an Service Operator (SO), etc., is inputted to the broadcast switch 311. Each service user assigns a TV channel that he or she wants to see. The broadcast channel selection controller 312 transfers a signal for assigning the TV channel to the broadcast switch 311 to select a digital broadcast channel wanted by each service user. Each service user may request a number of digital broadcast channels and up to K digital broadcast channels are switched. Thus, the maximum number of transmittable digital broadcast channels are set as a specification of the WDM-PON, because a number of broadcast receivers may be equipped in a single residence.

Communication data transmitted from the higher-level IP network is switched in the first Ethernet switch 313 on a user-by-user basis. The communication data, together with the digital broadcast signals, is then inputted to the communication/broadcast multiplexer 314. The communication/broadcast multiplexer 314 multiplexes the communication and broadcast data into a single channel using a multiplexing method, such as Time Division Multiplexing (TDM) and Frequency Division Multiplexing (FDM).

Figure 4:
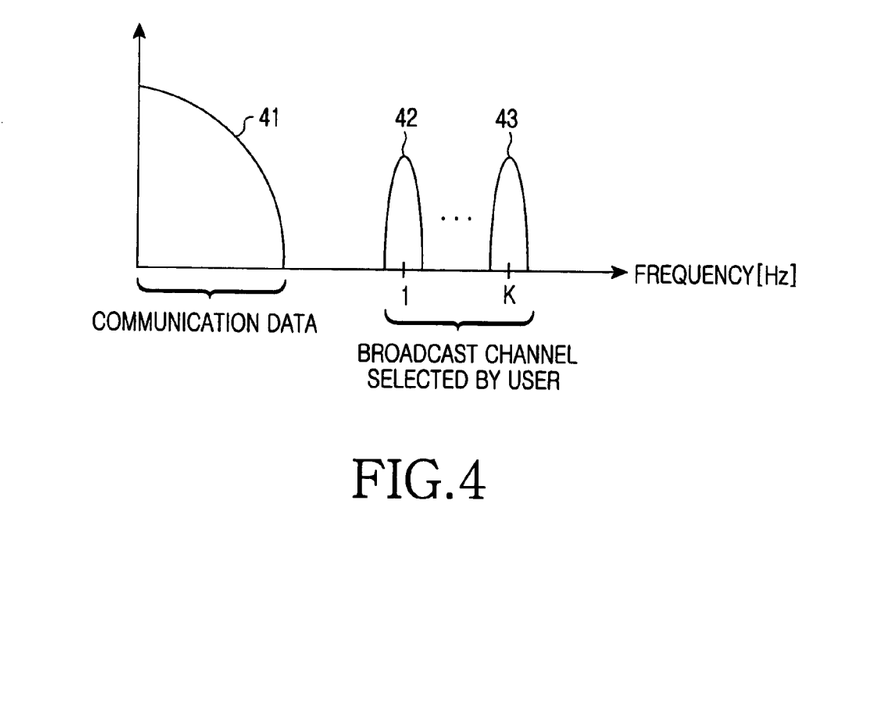
FIG. 4 illustrates that communication and broadcast services are multiplexed using FDM.
Figure 5:
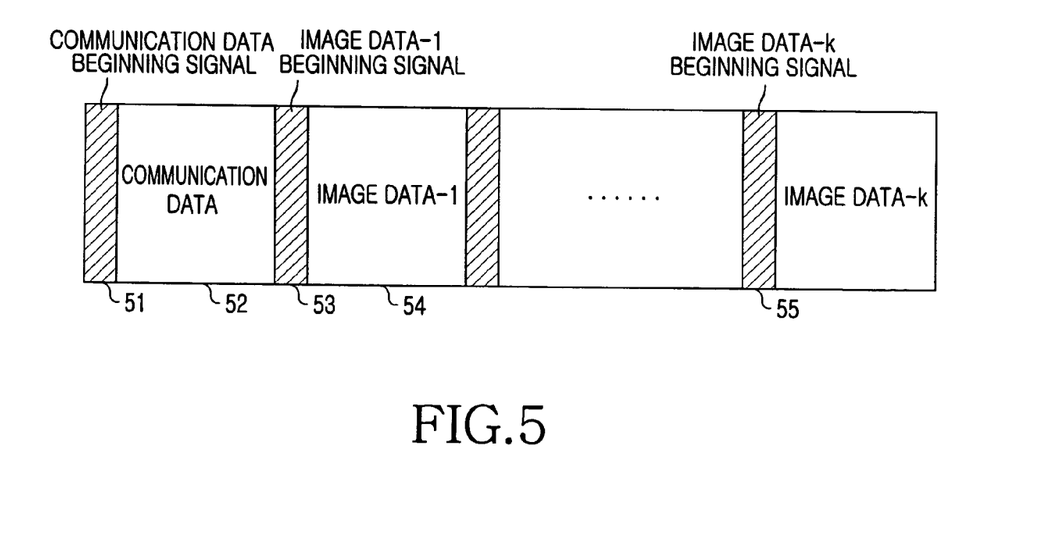
FIG. 5 illustrates that communication and broadcast services are multiplexed using TDM.

FIG. 4 illustrates that the communication and broadcast services/data are multiplexed using the FDM. FIG. 5 illustrates that they are multiplexed using the TDM. In FIG. 4, the communication data 41 is positioned in the baseband, and K digital broadcast data 42 and 43 are positioned in the passband. In FIG. 5, the communication data and the K digital broadcast data exist on the time axis, as a time packet.

The communication and digital broadcast data from the communication/broadcast multiplexer 314 are electro-optically converted in the optical transmitters 316. The optical transmitters 316 have unique transmission wavelengths $\lambda_1$ to $\lambda_n$, respectively.

After being multiplexed in the WDM multiplexer 318, the optically-modulated, the optical coupler 320 combines the communication/broadcast data, with an analog broadcast optical signal of $\lambda_A$ amplified in the optical amplifier 310.

The combined wavelength-multiplexed optical signal is transmitted through an optical cable. The analog broadcast optical signal $\lambda_A$ is separated from the combined optical signal by an optical splitter 35 on the receiver side. The communication/broadcast-multiplexed optical signals of $\lambda_1$ to $\lambda_n$ are separated from each other by the WDM demultiplexer 33 according to their wavelength. They are also photoelectrically converted by the optical receiver 323 in each ONT/ONU 32.

The communication/broadcast demultiplexer 321 demultiplexes the photoelectric-converted communication/broadcast multiplexed signal into K digital broadcast channels and communication data. Then they are transferred to a terminal device of the service user, such as a digital TV and a computer.

After the analog broadcast optical signal split through the optical splitter 35 is photoelectrically converted, the converted electrical signal is split through the RF splitter 37 to be transferred to each service user.

The upstream transmission operation of the WDM-PON of FIG. 3 is further described below. The upstream transmission represents transmission from the ONT/ONU 32 to the OLT 31. Signals transmitted from each service user to the OLT 31 are composed mainly of IP communication data generated by a computer, etc., and a broadcast channel selection signal for viewing a desired broadcast channel. The hub switch 322 in the ONT/ONU 32 combines the IP communication data and broadcast channel selection signal. They are electro-optically converted in the optical transmitter 324 with a transmission wavelength assigned to each of the ONT/ONUs 32. Then they are multiplexed in the WDM multiplexer 34 with wavelength signals from the other ONT/ONUs 32.

The multiplexed WDM optical signals are transmitted to the OLT 31 through an optical cable. The WDM demultiplexer 319 in the OLT 31 separates the signals from each other according to their wavelength.

Thereafter the wavelength signals are photoelectrically converted in the optical receiver 317. The converted electrical signals are each inputted to the second Ethernet switch 315. In the Ethernet switch 315, the broadcast channel selection signal is switched to the broadcast channel selection controller 312, and the IP communication data is switched to the first Ethernet switch 313 connected to the IP network.

The signals received by the broadcast channel selection controller 312 are used for controlling the broadcast switch 311. The signals transmitted to the first Ethernet switch 313 are transferred to the higher-level IP network.

Figure 6:
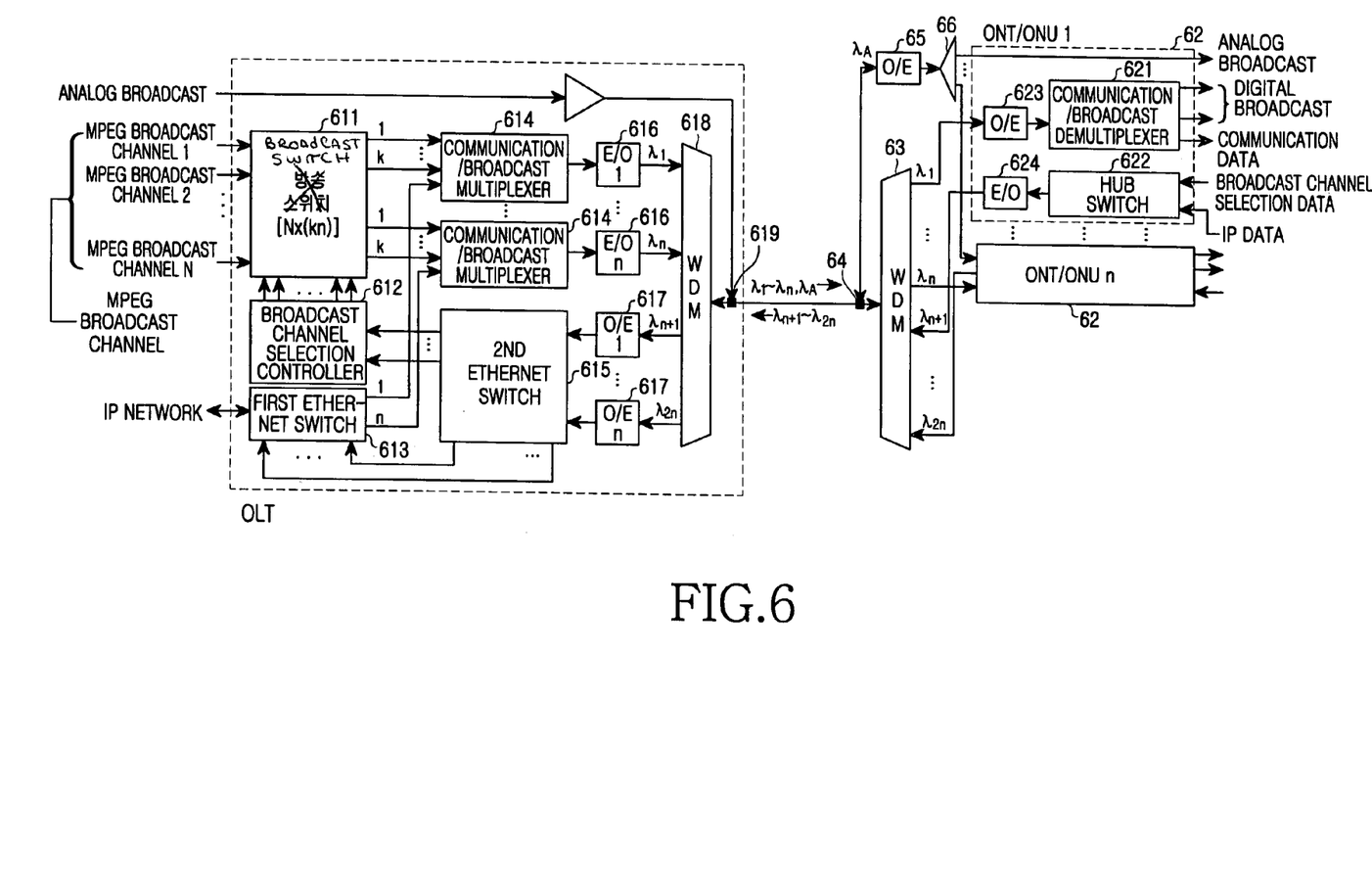
FIG. 6 shows a WDM-PON that enables the integration of broadcast and communication services, according to another embodiment of the present invention.

FIG. 6 shows a WDM-PON that enables the integration of broadcast and communication services/data, according to another embodiment of the present invention.

The embodiment shown in FIG. 6 differs from the embodiment shown in FIG. 3. in that the downstream wavelengths $\lambda_1$ to $\lambda_n$ and upstream wavelengths $\lambda_{n+1}$ to $\lambda_{2n}$ are different. Thus, a single WDM multiplexer/demultiplexer 618 in OLT 61 and a single WDM multiplexer/demultiplexer 63 in ONT/ONU 62 are required.

The operation and configuration of this embodiment is similar as that of the embodiment of FIG. 3, except that a single WDM multiplexer/demultiplexer is used in each of the OLT 61 and ONT/ONU 62 because the upstream and downstream wavelengths are different from each other.

Figure 7:
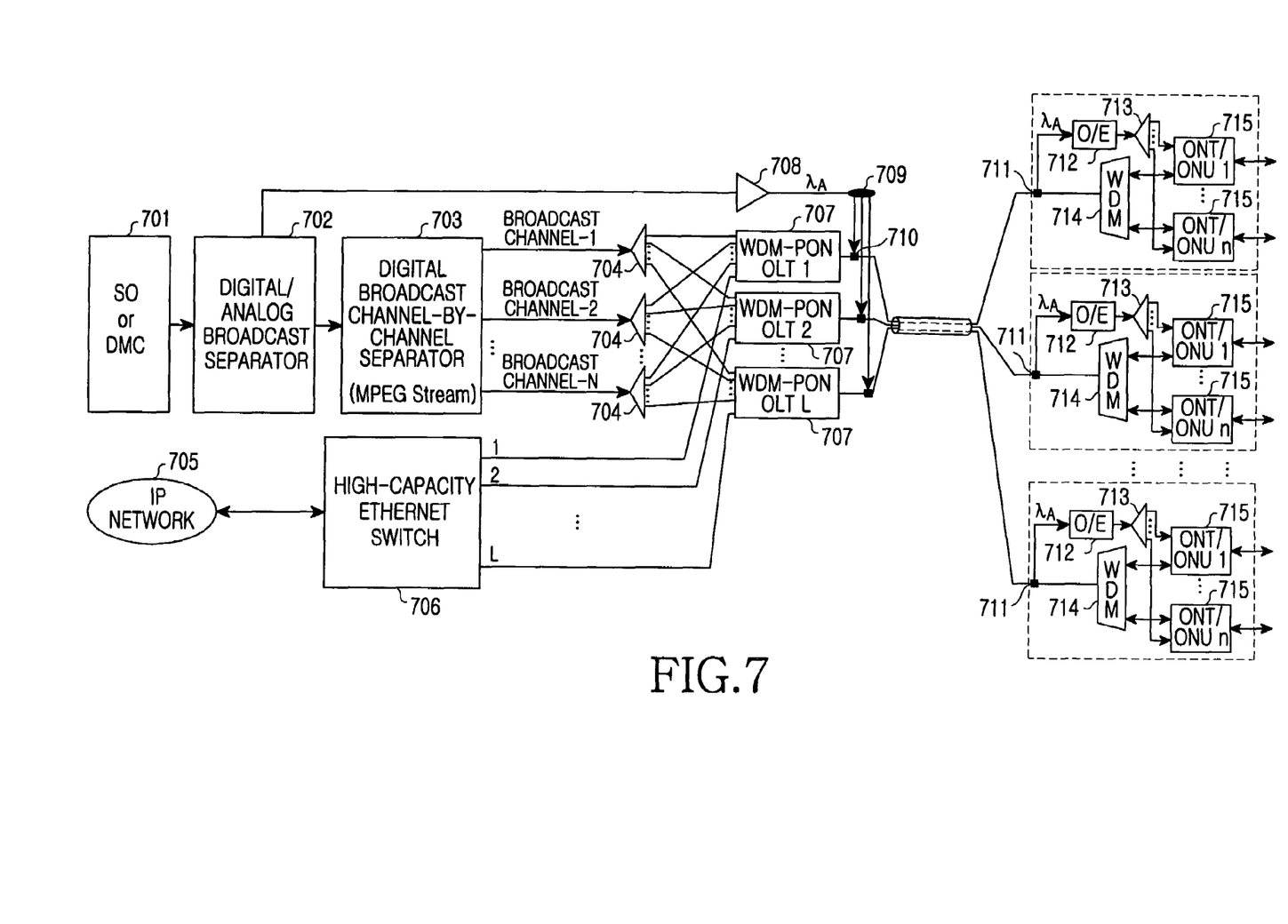
FIG. 7 shows an embodiment of a system that includes a plurality of parallel-connected WDM-PONs that enables the integration of communication and broadcast services according to the present invention.

FIG. 7 shows an embodiment of a system that includes a plurality of parallel-connected WDM-PONs that enables the integration of communication and broadcast services according to the present invention. As shown, a WDM-PON network accommodates L WDM-PON OLTs 707 and L×n ONT/ONUs 715, as further described below.

A digital/analog broadcast separator 702 separates analog and digital broadcast signals from an SO or a Digital Media Center (DMC) 701. The digital broadcast provided in this manner includes a digital image signal.

A digital broadcast channel-by-channel separator 703 separates the digital broadcast into its individual MPEG digital broadcast channels. The separated digital broadcast channels are each split into L ones through a splitter 704, and then transmitted to WDM-PON OLTs 707.

Communication data transmitted from an IP network 705 is switched in a high-capacity Ethernet switch 706 (or an IP router), and then transmitted to each of the WDM-PON OLTs 707.

The communication and broadcast data transmitted to the WDM-PON OLT 707 is transmitted to each ONT/ONU group, as described above in reference to FIG. 3.

Optical amplifier 708, optical splitter 709 and optical coupler 710 are used to combine an analog broadcast signal, from the digital/analog broadcast separator 702, with each of the OLT outputs. It is the transmitted to each ONT/ONU group through an optical cable.

In each ONT/ONU group, an analog broadcast optical signal is split through an optical splitter 711. Thereafter, it is photoelectrically converted by a photoelectric converter 712 and transmitted to each ONT/ONU 715 through a RF splitter 713.

Communication/broadcast multiplexed optical signals of $\lambda_1$ to $\lambda_n$ are separated from each other through a WDM demultiplexer 714 according to their wavelength. Then they are transmitted to the ONT/ONUs 715, respectively.

Upstream data transmission and broadcast channel selection methods in the embodiment of FIG. 7 are similar to those described in reference to FIG. 3.

The present invention provides a WDM-PON system that enables the integration of broadcast and communication services, thus providing subscribers with high-speed and high-capacity data and broadcast services using a wavelength division multiplexing scheme. Advantageously, a low-priced WDM-PON system for communication/broadcast-integrated services is achieved, because digital broadcast data is multiplexed with communication data. Thus, the need to accommodate digital broadcast is accomplished without the need to replace existing coaxial cable.

In addition, because communication/broadcast services are provided to subscribers through a single wavelength, it is possible to accommodate a larger number of subscribers, therefore providing an effective optical subscriber network for future requirements, such as with the future advent of Fiber To The Home (FTTH).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A Wavelength division multiplexing-passive optical network that enables an integration of broadcast and communication data, the network comprising:

an optical line terminal to (1) receive a digital broadcast signal from a broadcasting network and a first communication signal from an internet protocol network, and (2) transmit the digital broadcast signal and the first communication signal as a single integrated optical signal;

an optical network terminal/optical network unit at a user-side device for transferring (1) the single integrated optical signal, from the optical line terminal, to a service user, end (2) user data from the service user to the optical line terminal;

a first WDM demultiplexer for WDM-demultiplexing the single integrated optical signal from the optical line terminal, and transferring it to the optical network terminal/optical network unit; and a first WDM multiplexer for WDM-multiplexing the user data from the optical network terminal/optical network unit and transferring it to the optical line terminal, wherein the optical line terminal is further enabled to transfer a second communication signal, received from the service user, to the Internet protocol network;

wherein the user data includes channel-information data of a digital broadcast desired by the service user and the second communication signal; and wherein the optical line terminal further includes:
a broadcast switch for switching digital broadcast data from the broadcasting network;
a broadcast channel controller for selecting the digital broadcast signal desired by the service user by controlling the broadcast switch according to the channel-information data included in the user data;
a first Ethernet switch for switching each of the first and second communication signal so as to transmit the second communication signal included in the user data to the Internet protocol network, or to transmit the first communication signal to the optical network terminal/optical network unit;
a communication/broadcast multiplexer for multiplexing the first communication signal and the digital broadcast signal;
a second Ethernet switch for separating the user data received from the service user into the channel-information data and the second communication signal from the service user;
a first optical transmitter for optically modulating the first communication signal and the digital broadcast signal, multiplexed through the communication/broadcast multiplexer, into the single integrated optical signal by its electro-optical conversion;
a second WDM multiplexer for multiplexing wavelength-by-wavelength signals, optically modulated through the first optical transmitter, and transferring them to the optical network terminal/optical network unit;
a second WDM demultiplexer for separating optical signals, transmitted from the optical network terminal/optical network unit, according to their wavelength; and
a first optical receiver for photoelectrically converting the optical signals separated according to their wavelength through the second WDM demultiplexer.

2. The network as set forth in claim 1,
wherein the optical network terminal/optical network unit includes:
a second optical receiver for receiving the single integrated optical signal transmitted from the optical line terminal through the first WDM demultiplexer, and photoelectrically converting the received signal;
a communication/broadcast demultiplexer for separating the single integrated optical signal, received through the second optical receiver, into the first communication signal and the digital broadcast signal;
a hub switch for forming the user data by joining together the channel-information data for selecting the digital broadcast signal desired by the service user and the second communication signal provided from the service user to the Internet protocol network; and
a second optical transmitter for electro-optically converting the user data, joined together through the hub switch, to be optically modulated, and transmitting it to the first WDM multiplexer for the purpose of transmitting it to the optical line terminal.

3. The network as set forth in claim 2, wherein a single wavelength for optical transmission between the optical line terminal and the optical network terminal/optical network unit is assigned to each service user.

4. The network as set forth in claim 2, wherein the optical line terminal further includes an optical amplifier for optically-modulating and amplifying an analog broadcast signal, and an optical coupler for combining the analog broadcast signal with the single integrated optical signal, so as to receive and transmit the analog broadcast signal,
the network further comprising:
an optical splitter for separating an optical signal, combined with the analog broadcast signal, from the optical line terminal into the analog broadcast signal and the single integrated optical signal, and transmitting the separated signals;
a photoelectric converter for photoelectrically converting the analog broadcast signal separated through the optical splitter; and
a radio frequency) splitter for distributing the photoelectrically-converted electrical analog broadcast signal to the optical network terminal/optical network unit.

5. A wavelength division multiplexing-passive optical network that enables an integration of broadcast and communication data, the network comprising:
an optical line terminal to (1) receive a digital broadcasting signal from a broadcasting network and a first communication signal from an Internet protocol network, and (2) transmit the digital broadcast signal and the first communication signals as a single integrated optical signal;
an optical network terminal/optical network unit as a user-side device for transferring (1) the single integrated optical signal, from the optical line terminal, to a service user, and (2) user data from the service user to the optical line terminal using an optical signal having a wavelength different from the single integrated optical signal; and
a first WDM multiplexer/demultiplexer for (1) receiving and WDM-demultiplexing the single integrated optical signal from the optical line terminal, (2) transferring the integrated optical signal to the optical network terminal/optical network unit, (3) WDM-multiplexing the user data from the optical network terminal/optical network unit, and (4) transferring the user data to the optical line terminal;
wherein the optical line terminal is further enabled to transfer a second communication signal, received from the service user, to the IP network;
wherein the user data includes channel-information data of a digital broadcast desired by the service user and the second communication signal;
and wherein the optical line terminal including:
a broadcast switch for switching digital broadcast data from the broadcasting network;
a broadcast channel controller for selecting the digital broadcast signal desired by the service user by controlling the broadcast switch according to the channel-information data included in the user data;
a first Ethernet switch for switching each of the first and second communication signals so as to transmit the second communication signal included in the user data to the Internet protocol network, or to transmit the first communication signal to the optical network terminal/optical network unit;
a communication/broadcast multiplexer for multiplexing the first communication signal and the digital broadcast signal;
a second Ethernet switch for separating the user data received from the service user into the channel-information data and the second communication signal from the service user;
a first optical transmitter for optically modulating the first communication signal and the digital broadcast signal, multiplexed through the communication/broadcast multiplexer, into the single integrated optical signal by its electro-optical conversion;

a second WDM multiplexer/demultiplexer for multiplexing wavelength-by-wavelength signals, optically modulated through the first optical transmitter, and transferring them to the optical network terminal/optical network unit, and further separating optical signals, transmitted from the optical network terminal/optical network unit, according to their wavelengths; and a first optical receiver for photoelectrically converting the optical signals separated according to their wavelength through the second WDM multiplexer/demultiplexer.

6. The network as set forth in claim 5, wherein the optical network terminal/optical network unit includes:

a second optical receiver for receiving the single integrated optical signal, demultiplexed through the first WDM multiplexer/demultiplexer and transmitted from the optical line terminal, and photoelectrically converting the received signal;

a communication/broadcast demultiplexer for separating the single integrated optical signal, received through the second optical receiver, into the first communication signal and the digital broadcast signal;

a hub switch for forming the user data by joining together the channel-information data for selecting the digital broadcast signal desired by the service user and the second communication data provided from the service user to the Internet protocol network; and a second optical transmitter for electro-optically converting the user data, joined together through the hub switch, to be optically modulated, and transmitting it to the first WDM multiplexer/multiplexer for the purpose of transmitting it to the optical line terminal.

7. The network as set forth in claim 5, wherein the optical line terminal further includes an optical amplifier for optically-modulating and amplifying an analog broadcast signal, and an optical coupler for combining the analog broadcast signal with the single integrated optical signal, so as to receive and transmit the analog broadcast signal, the network further comprising:

an optical splitter for separating an optical signal, combined with the analog broadcast signal, from the optical line terminal into the analog broadcast signal and the single integrated optical signal, and transmitting the separated signals;

a photoelectric converter for photoelectrically converting the analog broadcast signal separated through the optical splitter; and a radio frequency splitter for distributing the photoelectrically-converted electrical analog broadcast signal to the optical network terminal/optical network unit.

* * * * *